(12) United States Patent
Leisner et al.

(10) Patent No.: US 6,603,097 B2
(45) Date of Patent: Aug. 5, 2003

(54) METHOD AND APPARATUS FOR CONTROLLING ENGINE SPEED OF A WELDING GENERATOR

(75) Inventors: John C. Leisner, Appleton, WI (US); Daniel C. Fosbinder, Appleton, WI (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 09/882,199

(22) Filed: Jun. 15, 2001

(65) Prior Publication Data

US 2002/0190044 A1 Dec. 19, 2002

(51) Int. Cl.$^7$ ................................................. B23K 9/10
(52) U.S. Cl. ...................................... 219/133; 290/40 R
(58) Field of Search ........................ 219/133; 290/1 A, 290/1 R, 37 A, 40 A, 40 B, 40 F, 40 R

(56) References Cited

U.S. PATENT DOCUMENTS

| | | | |
|---|---|---|---|
| 2,815,974 A | * 12/1957 | Stubbe | ............... 290/40 F |
| 3,513,325 A | * 5/1970 | Tharp | ............... 290/40 R |
| 4,293,756 A | * 10/1981 | Hoyt, Jr. et al. | ............ 219/133 |
| 5,376,877 A | 12/1994 | Kern et al. | |
| 5,504,417 A | 4/1996 | Kern et al. | |
| 5,561,330 A | 10/1996 | Crook | |
| 5,861,604 A | 1/1999 | McLean et al. | |
| 5,968,385 A | 10/1999 | Beeson et al. | |
| 5,977,646 A | 11/1999 | Lenz et al. | |
| 6,111,217 A | 8/2000 | Beeson et al. | |
| 6,118,186 A | * 9/2000 | Scott et al. | ................. 290/1 A |
| 6,166,525 A | 12/2000 | Crook | |

* cited by examiner

*Primary Examiner*—Clifford C. Shaw
(74) *Attorney, Agent, or Firm*—Ziolkowski Patent Solutions Group, LLC

(57) ABSTRACT

A method and apparatus for controlling the engine speed of a welding generator is disclosed. A first time delay permits the engine to warm up sufficiently at a run speed before switching the engine speed to an idle speed. A second time delay permits continuous operation of the engine at the run speed during brief interruptions in the demand for output power.

40 Claims, 5 Drawing Sheets

METHOD AND APPARATUS FOR CONTROLLING ENGINE SPEED OF A WELDING GENERATOR

FIELD OF THE INVENTION

The present invention relates generally to engine driven welding generators. More specifically, it relates to a method and apparatus for controlling the engine speed of a welding generator.

BACKGROUND OF THE INVENTION

Engine driven generators are commonly used in welding. These welding generators are used extensively in connection with welding operations performed at remote locations where access to conventional utility power is limited or unavailable. Generators are also used by those who perform welding operations at multiple locations because they allow for portability without the need for access to utility power. In addition to a welding output, an auxiliary output (e.g., 120 or 240 volts 60 Hz ac for example) is also typically provided from the welding generator to run power tools, lights, etc. . . . .

Engine driven welding generators include an engine (e.g, gasoline, diesel, propane, etc . . . ) and a generator. The term generator, as used herein, may include one or more generator stages or welding power supply stages. The generator stages are driven by the engine. A single generator stage may supply both the welding output and the auxiliary power. In other welding generators, two generator stages are provided, one supplying the welding power and the other supplying the auxiliary power. Both generator stages are driven by the engine. In yet another configuration, one generator stage provides auxiliary power and power to a welding power supply stage. The welding power supply stage receives the power from the generator stage and converts it into a welding output in a similar manner to the way a conventional welding power supply converts utility power into a welding output.

The engine of an engine driven welding generator is typically configured to operate at two speeds. It should be understood, however, that some engine driven welding generators have engines that operate at more than two speeds such as three or more speeds. The lower of the two speeds is referred to as the idle speed. The higher of the two speeds is referred to as the run speed.

The idle speed is the speed at which the engine normally operates when the welding generator is not supplying rated welding output power or auxiliary power. Although some welding generators are configured to provide output power when idling, these generators also operate at the idle speed when not providing output power. The term output power, as used herein in regards to a welding generator, includes both weld power and auxiliary power.

The actual speed at which an engine idles is typically chosen to be at or near the minimum speed required in order to maintain weld integrity when welding first begins (before the engine has a chance to switch to the run speed). Idle speeds for welding generators typically range between 900–2700 rpms with the vast majority of welding generators idling somewhere between 2200–2600 rpms. 1500 and 1800 rpms are also common idle speeds because 50 Hz and 60 Hz auxiliary output power are easily generated at these speeds using a four pole rotor.

Welding generally is performed with the engine operating at run speed. This is because most generators are configured to provide maximum horsepower at run speed. Auxiliary power is also typically provided with engines operating at run speed. Run speed, therefore, is typically the engine speed that will provide the maximum rated welding output power from the generator as well as auxiliary power at the desired frequency directly from the generator (e.g., 50 Hz or 60 Hz for example).

Engine run speeds typically range between approximately 1800–1900 rpms or 3600–3700 rpms. 3000 rpms is also a common engine speed, for example, because 50 Hz auxiliary output power is easily generated at this speed using a two pole rotor. Likewise, 3600 rpms is a common engine speed for providing 60 Hz auxiliary output power.

Prior art engine driven welding generators are configured to sense either a load current or the output power (either at the weld output or the auxiliary output of the generator). If the sensed load current or output power level exceeds a predetermined threshold, the engine automatically switches from idle speed to run speed to meet the demand for output power. The threshold level is generally set at a level that will reliably indicate whether welding is taking place or whether a device connected to the auxiliary output is demanding power. Once the threshold is exceeded, the engine will remain at run speed until the demand for output power stops (e.g, the load current or output power drop below the threshold).

Many prior art welding generators are configured to maintain the engine speed of the engine at the run speed even after the demand for weld power or auxiliary power ceases to exist (e.g., after the load current or output power drop below the threshold). This is because most welds are not made as one long continuous weld, but rather are made up of numerous short repetitive welds. It is common, therefore, for the user of a welding generator to cease welding for a brief period of time to make adjustments to the weld or the welding equipment (e.g., replace a welding electrode). Likewise, the user of a device connected to the auxiliary output may stop using the device briefly to make adjustments. These activities result in a momentary interruption in the demand for output power from the generator. In each of these cases however, a renewed demand for output power from the generator will typically be made within a short period of time.

To prevent the engine from switching back and forth between run speed and idle speed when a brief interruption in the demand for output power occurs, prior art welding generators provide a time delay before the engine slows to idle speed when the demand for output power terminates or is interrupted. Prior art welding generators use the same time delay regardless of the type of welding being performed and regardless of whether it is weld power or auxiliary power that is being provided.

The use of a single time delay can be problematic, however. This is because different types of welding typically require different types of adjustments, some of which may take longer to perform than others. Stick welding, for example, typically requires more adjustments to be made during the welding operation than does MIG or TIG welding. During stick welding, the operator repeatedly stops the welding process to replace the stick electrode and to chip away the slag material that forms on the weld. Electrode replacement and slag removal is generally not required during MIG or TIG welding.

To balance on the one hand the desire for an adequate time delay for each of the various welding types with on the other hand, the desire to not have the engine operate at run speed unnecessarily, prior art welding generators have incorporated a time delay that is a compromise between what is desirable for stick welding and what is desirable for MIG or TIG welding. As a result, prior art welding generators typically incorporate a single time delay of 12–14 seconds which provides a workable compromise. This means, however, that the time delay provided for the operator to perform the necessary adjustments when performing stick welding is shorter than is generally required and the time delay provided for those performing MIG and TIG welding is longer than is generally required.

It is desirable, therefore to have a welding generator that incorporates different length time delays for different types of welding. Preferably, the welding generator will provide a 10–12 second time delay for MIG and/or TIG welding while a 18–20 second time delay will be provided for stick welding. It is also desirable to have a welding generator that incorporates a variable time delay. Preferably, the operator of the welding generator will be able to set the duration of the time delay to meet his or her needs.

Engines used in welding generators typically require a short period of "warm-up time" after they are first started before they can sustain operation at idle speed. This is especially true in cold weather conditions. To provide for this warm-up period, prior art welding generator engines are configured to operate at run speed after the engine is first started and continue to operate at run speed for a period of time immediately after the engine starts. After this time delay, the engine automatically switches to idle speed.

In prior art welding generators, a single device provides the warm-up period time delay and the time delay that is used when the generator stops providing output power. Thus, prior art welding generators incorporate a 12–14 second warm-up time delay before the engine automatically switches to idle speed after first being started. As it turns out, however, a much shorter period of time is typically required to allow the engine to warm up sufficiently to maintain operation at idle speed. For example, as little as a 3–5 seconds is typically all the time that is needed.

Allowing a cold engine to run for an extra 7–11 seconds is problematic in several regards. First, it results in unnecessary wear and tear on the engine. Second, it wastes fuel. And third, it creates an unnecessarily noisy environment for the operator. In addition to the above problems, there is the general perception of operators of welding generators that running the engine at run speed when no power demands are being made on the generator is bad for the generator.

It is desirable, therefore, to have a welding generator that provides a shorter warm-up period for switching the engine to idle speed immediately after the engine is started. Preferably, the duration of the time delay will be approximately equal to the minimum amount of time required for the engine to warm-up sufficiently to sustain operation at the idle speed. It is also desirable to have a welding generator that incorporates a variable warm-up time delay. Preferably, the operator of the welding generator will be able to set the duration of the time delay to meet his or her needs and the environmental conditions at hand.

Another problem with the warm-up time delay utilized by prior art welding generators is that the warm-up period is triggered (e.g, begins) when the ignition switch on the generator is turned to the run position. However, the engine does not start until the ignition switch is turned to the start or crank position and thus cannot begin warming up when the prior art warm-up period begins to run. It is desirable, therefore, to have a warm-up period that begins to run when the engine starts. Preferably, the warm-up period will begin to run when the ignition key is released from the start position with the engine running.

Finally, another problem with prior art welding generators is that they typically do not switch from idle speed to run speed until welding actually begins. This can create problems because the welding process begins when the engine is at idle speed or during the time period when the engine is switching between idle speed and run speed. For example, this can adversely effect the arc starting process as well as the integrity of the weld. It is desirable, therefore, to have a welding generator that can switch to run speed before welding actually begins to allow the engine to be operating at run speed when the demand for welding power is first received. Preferably, the operator will be able to initiate the switch to run power in an efficient and timely manner, such as by activating the trigger of a welding gun or by closing the contacts on a remote control device connected to the welding gun.

SUMMARY OF THE PRESENT INVENTION

According to a first aspect of the invention, a welding apparatus includes an engine, a generator operatively coupled to the engine and an engine speed controller. The generator provides at least one of a welding output or an auxiliary power output. The engine speed controller is configured to control operation of the engine such that the engine operates at a run speed upon starting and then changes speed to an idle speed following a first time delay that is substantially equal to the minimum period of time required for the engine to warm up sufficiently after starting to maintain engine operation at the idle speed.

In one embodiment, the second time delay is different in duration than the first time delay. In other embodiments, one or more of the first and second time delays are variable and their duration can be adjusted by an operator of the welding apparatus.

In another embodiment, the engine operates at the run speed when output power is provided. The engine speed controller provides a second time delay to delay switching of the engine speed to the idle speed when the welding apparatus stops providing output power in this embodiment, thereby permitting continuous operation of the engine at the run speed during brief interruptions in the demand for output power.

According to a second aspect of the invention, a method of operating an engine driven welding generator includes providing a first engine speed control signal to the engine. In response to the first engine speed control signal, the engine is operated at a run speed upon starting and the engine speed is changed to an idle speed after a time delay that is substantially equal to the minimum period of time required for the engine to warm up sufficiently after starting to maintain engine operation at the idle speed.

In one embodiment the method also includes providing a second engine speed control signal to the engine. In response to the second engine speed control signal, the engine operates at the run speed when output power is provided and switching of the engine speed to the idle speed when the welding apparatus stops providing output power is delayed.

According to a third aspect of the invention, a welding apparatus includes an engine, a generator operatively coupled to the engine and an engine speed controller. The engine is capable of operation at a run speed and an idle speed. The generator provides at least one of a welding output or an auxiliary power output. The engine speed controller includes an input for receiving an engine starting signal indicative of the engine starting and provides an engine speed control signal to the engine in response to the engine starting signal.

In one embodiment the engine starting signal is an engine cranking signal provided from an ignition switch. In another embodiment, the engine receives the engine speed control signal and in response operates at the run speed when first started and then automatically changes speed to the idle speed after a time delay. The time delay is substantially equal to the minimum time period required for the engine to warm up sufficiently to maintain engine operation at the idle speed in another embodiment.

In alternative embodiments, the time delay is approximately 3–5 seconds in duration and is a variable time delay that can be adjusted by the operator of the welding apparatus.

According to a fourth aspect of the invention, a method of operating an engine driven welding generator includes providing an engine starting signal indicative of the engine starting and controlling the speed of the engine in response to the engine starting signal. Controlling the speed of the engine includes operating the engine at a run speed when first started and then changing the speed of the engine to an idle speed after a time delay in one embodiment. The time delay is substantially equal to the minimum time period required for the engine to warm up sufficiently to maintain engine operation at the idle speed in another embodiment. The time delay is approximately 3–5 seconds in duration in yet another embodiment.

According to a fifth aspect of the invention, an engine driven welding generator includes an engine. The engine operates at a run speed when first started and then automatically changes speed to an idle speed after a time delay that is substantially equal in length to the minimum period of time required for the engine to warm up sufficiently after starting to maintain engine operation at the idle speed.

According to a sixth aspect of the invention, a welding apparatus includes an engine, a generator operatively coupled to the engine, a first engine speed control circuit and a second engine speed control circuit. The engine is capable of operation at a run speed and an idle speed. The generator provides at least one of a welding output or an auxiliary power output. The first engine speed control circuit provides a first engine speed control signal to the engine such that the engine operates at the run speed when first started and then automatically changes speed to the idle speed after a first time delay. The second engine speed control circuit provides a second engine speed control signal to the engine such that the engine operates at the run speed after the generator stops providing output power and then automatically changes to the idle speed after a second time delay.

The second time delay is different in duration than the first time delay in one embodiment. The first time delay is approximately 3–5 seconds in duration and the second time delay is approximately 10–20 seconds in duration in another embodiment. The first time delay is substantially equal to the minimum time period required for the engine to warm up sufficiently to maintain engine operation at the idle speed and the second time delay is approximately 10–20 seconds in duration in yet another embodiment. In an alternative embodiment, the second time delay is a variable time delay the duration of which can be adjusted by the operator of the welding apparatus.

According to a seventh aspect of the invention, a welding apparatus includes an engine, a generator operatively coupled to the engine and an engine speed controller. The generator provides at least one of a welding output or an auxiliary power output. The engine speed controller is configured to control the engine such that the engine operates at a run speed upon starting and then changes speed to an idle speed after a first time delay and further operates at the run speed after the generator stops providing output power and then changes to the idle speed after a second time delay different in duration from the first time delay.

The first time delay is substantially equal to the minimum time period required for the engine to warm up sufficiently to maintain engine operation at the idle speed in one embodiment and is approximately 3–5 seconds in duration in another embodiment. In an alternative embodiment, the second time delay is approximately 10–20 seconds in duration. The first and second time delays are variable and can be adjusted by an operator of the welding apparatus in other embodiments.

According to an eigth aspect of the invention, a method of operating an engine driven welding generator includes starting the engine. The engine is then operated at a run speed. Next, the engine is switched to an idle speed after a first time delay. Output power is then provided by the engine. The engine then operates at the run speed after the welding apparatus stops providing output power. The engine speed is then switched to the idle speed after a second time delay different in duration from the first time delay.

According to a ninth aspect of the invention, a method of operating an engine driven welding generator includes providing a first time delay signal to control engine speed when the engine is first started. In response to the first time delay signal, permitting the engine to warm up sufficiently at run speed before switching the engine speed to an idle speed. Providing a second time delay signal to the engine different in duration from the first time delay signal. In response to the second time delay signal, permitting continuous operation of the engine at run speed during brief interruptions in the demand for output power.

In one embodiment, the first time delay is approximately 3–5 seconds in duration and the second time delay is approximately 10–20 seconds in duration. In another embodiment, the first time delay is substantially equal to the minimum time period required for the engine to warm up sufficiently to maintain engine operation at the idle speed and the second time delay is approximately 10–20 seconds in duration.

According to a tenth aspect of the invention, an engine driven welding generator includes an engine having a first time delay for changing the speed of the engine to an idle speed after the engine is started and a second time delay, different in duration from the first time delay, for switching the engine to the idle speed after the welding generator stops providing output power.

According to an eleventh aspect of the invention, a welding apparatus includes an engine, a generator operatively coupled to the engine and an engine speed controller. The generator provides at least one of a welding output or an auxiliary power output. The engine speed controller provides a first time delay for changing the speed of the engine to an idle speed after the welding apparatus stops providing a first type of welding power and a second time delay, different in duration from the first time delay, for switching the engine to the idle speed after the welding apparatus stops providing a second type of welding power different from the first type of welding power.

The first time delay is approximately 10–12 seconds in duration and the second time delay is approximately 18–20 seconds in duration in one embodiment. The first type of welding power is a selective one of MIG or TIG welding power and the second type of welding power is stick welding power in another embodiment. The first time delay is a variable time delay that can be adjusted by the operator of the welding apparatus in yet another embodiment.

According to a twelfth aspect of the invention, a welding apparatus includes an engine, a generator operatively coupled to the engine, and an engine speed controller. The generator provides at least one of a welding output or an auxiliary power output. The engine speed controller provides a time delay for changing the speed of the engine to an idle speed after the generator stops providing welding output power. The engine speed controller includes an input for receiving a welding type sense signal indicative of the type of welding output power provided. The duration of the time delay is a function of the welding type sense signal.

According to a thirteenth aspect of the invention, an engine driven welding generator includes an engine. The time delay in switching the engine speed of the engine to idle speed after the welding generator stops providing output power is a function of the type of welding output power provided by the welding generator.

Other principal features and advantages of the invention will become apparent to those skilled in the art upon review of the following drawings, the detailed description and the appended claims.

Figure 1:
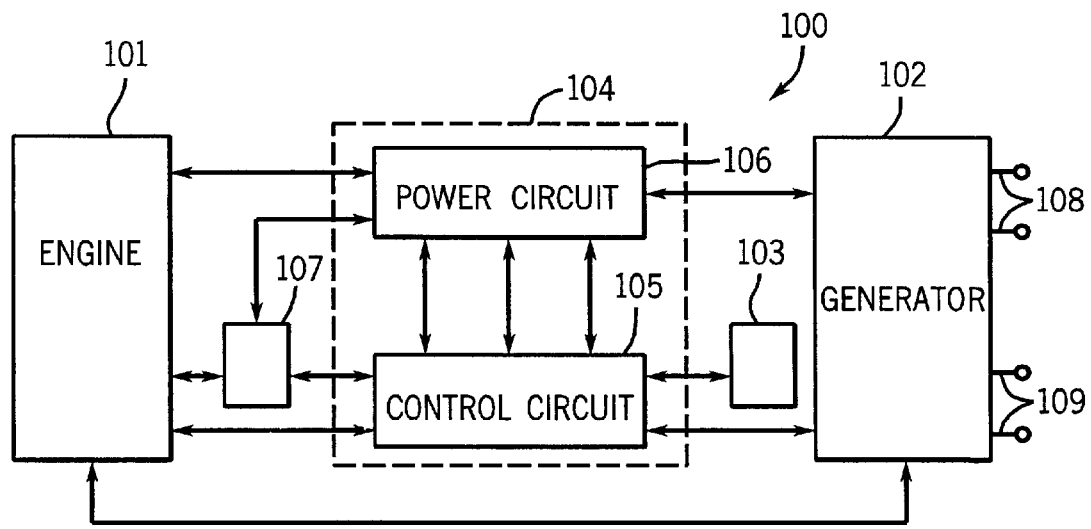
FIG. 1 shows a block diagram of an engine driven welding generator according to one embodiment of the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular engine driven welding generator having a particular configuration and particular features, the present invention is not limited to this configuration or to these features and other configurations and features can be used. Similarly, while the present invention will be illustrated with reference to a particular scheme for controlling engine speed, other engine speed control schemes can be used.

Generally, the present invention involves an engine driven welding generator having an engine and a generator operatively coupled to the engine. The generator provides a welding output signal. Welding output and welding output signal, as used herein, includes signals that are suitable for welding, induction heating, plasma cutting and air carbon arc cutting. In one embodiment, the generator also provides an auxiliary power output (typically 120 or 240 volt 60 Hz ac signal or a 220 volt 50 Hz ac signal) for operating various other devices including power tools, lights, etc . . . . In another embodiment, a separate generator is operatively coupled to the engine to provide the auxiliary power output.

The engine, according to one embodiment of the present invention, runs at two speeds, namely an idle speed (approximately 2200 rpms) and a run speed (approximately 3700 rpms). Welding and auxiliary power are provided from the generator when the generator is operating at the run speed. The engine operates at idle speed when it is not supplying output power.

The engine in one embodiment of the present invention switches from idle speed to run speed when a load current is detected that exceeds a threshold (e.g., when output power is provided). The load current can be either a weld current drawn at the welding output, a load current being drawn at the auxiliary output, or, in this embodiment, a current drawn by the drive motor of a wire feeder connected to the welding generator.

Once a load current is sensed in excess of the threshold, the engine remains operating at the run speed while output power is supplied to the load (e.g., while current is being drawn) and for a period of time after the welding generator stops providing output power (e.g, the load current falls below the threshold). The length of the time delay in switching the engine back to idle speed is different for different types of welding in one embodiment of the present invention.

At least two different length time delays are provided in this embodiment. A shorter time delay is provided for MIG welding while a longer time delay is provided for stick and TIG welding. Likewise, in another embodiment, the length of the time delay provided when the welding generator stops providing auxiliary power is different from that provided when the generator stops providing welding power. In this way, engine speed can be controlled differently for each type of welding being performed and also when the auxiliary output is used.

A different time delay is utilized by the welding generator when the engine is first started in one embodiment of the present invention. This time delay is provided to allow the engine to warm-up before the engine switches to idle speed. The length of the time period required for the engine to warm up adequately is much shorter than the typical delay period provided when the welding generator stops providing output power. A shorter time delay is therefore provided to allow the engine to warm-up sufficiently when first started before the engine switches from run speed to idle speed. In one embodiment, the warm-up time delay is substantially equal to the minimum period of time required for the engine to warm up sufficiently after starting to maintain engine operation at the idle speed.

The engine switches from idle speed to run speed before welding starts in another embodiment. This feature is available when MIG and TIG welding are selected in this embodiment. The operator pulls the trigger on a welding gun or closes the contacts on a remote control device connected to the welding gun. A contactor closure signal is then sent to the welding generator. The welding generator receives the contactor closure signal and switches the engine to run speed. The engine continues to operate at run speed even after the contactor closure signal disappears for a period of time that is equal to the time delay used when the generator stops providing output power. Thus, the operator can click the welding gun trigger momentarily, wait for the engine to switch to run speed, and then begin welding with the engine fully operating at run speed when welding begins.

FIG. 1 shows a block diagram of an engine driven welding generator 100 according to one embodiment of the present invention. Generator 100 includes an engine 101, a generator 102, a user selectable input 103 and an engine speed controller 104 including a control circuit 105 and a power circuit 106. Welding generator 100 also includes an ignition switch 107 for starting engine 101.

Generator 102 is operatively connected to engine 101 and includes one or more rotors spinning inside of one or more stators. Generator 102 provides welding power at welding output 108 and auxiliary power at auxiliary output 109. Control circuit 105 and power circuit 106 are in electrical communication with each other as well as with engine 101 and generator 102. User selectable input 103 is in electrical communication with control circuit 105.

Although the various components of welding generator 100 perform a variety of functions, our attention here is focused only on those functions and features that relate to controlling engine speed in accordance with the present invention. The other functions and features of welding generator 100, including control circuit 105 and power circuit 106, are well understood by those of ordinary skill in the art and will not be discussed herein.

With respect to controlling engine speed, welding generator 100 operates in the following manner. Engine speed controller 104 includes a control circuit 105 and a power circuit 106. Control circuit 105 provides all of the low power control signals while power circuit 106 provides the high power control and switching signals. In an alternative embodiment, all of these signals are provided by a single circuit. An overview of the overall operation of engine controller 104 will now be provided.

Control circuit 105 receives an engine crank signal from engine 101. The engine crank signal is provided by ignition switch 107 when the ignition switch is switched to the start position. The engine crank signal indicates that the engine is in the process of being started (e.g., cranked over). Similarly, a load current feedback signal is received by control circuit 105 from generator 102. The load current feedback signal indicates that output power is being supplied by welding generator 100.

The engine crank signal and load current feedback signal are processed by control circuit 105 and a low power idle command signal is provided to power circuit 106 in response to the these input signals. The idle command signal is processed by power circuit 106 and a high power engine speed control signal is provided to engine 101. The engine speed control signal, which is provided in response to the engine crank signal and load current feedback signal, is used to open and close the throttle on engine 101 thereby controlling engine speed and switching engine 101 from idle speed to run speed whenever the engine is being started or whenever output power is supplied.

In addition to the above signals, user selectable input 103 is provided to allow the operator of welding generator 100 to select the type of welding to be performed. User selectable input 103 provides a signal to control circuit 105 indicating the type of welding to be performed. Control circuit 105 processes the signal and uses it for various purposes as described in more detail below.

Figure 3:
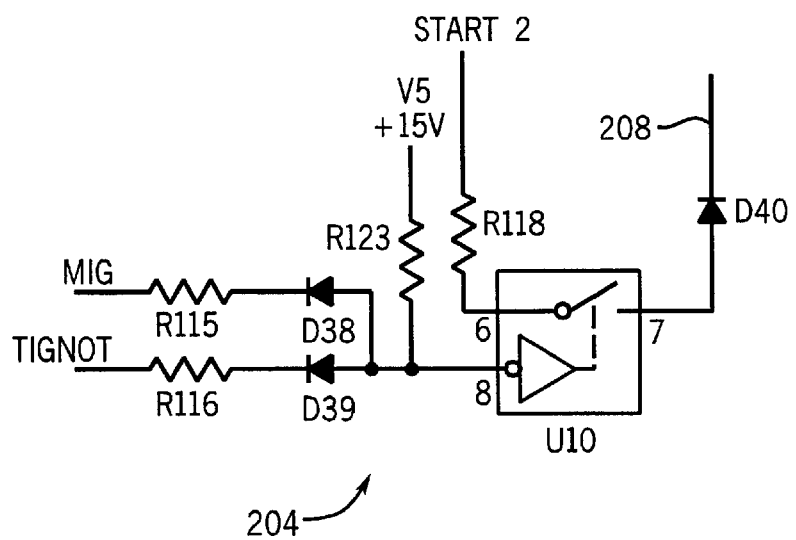
FIG. 3 shows an electrical schematic diagram for contact closure sense circuit contained in an engine speed controller according to one embodiment of the present invention.
Figure 2:
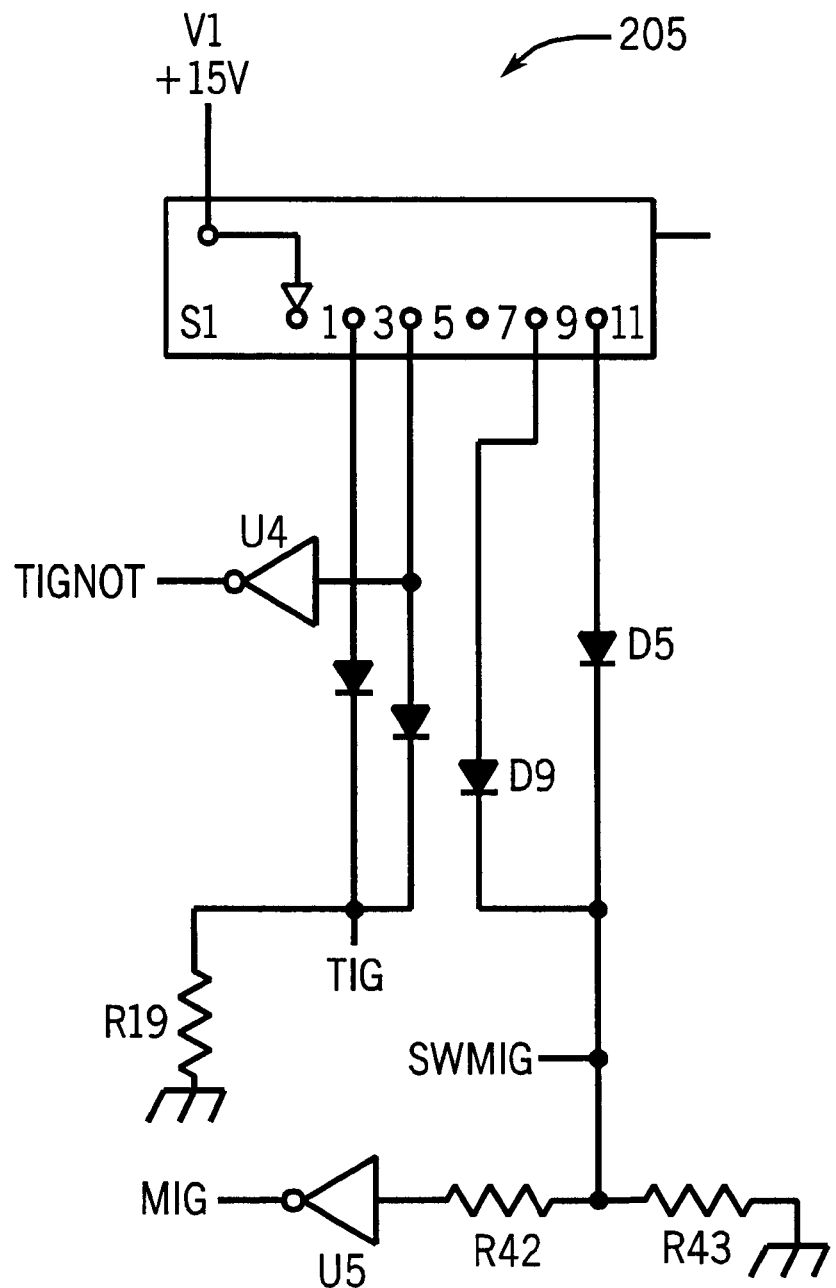
FIG. 2 shows an electrical schematic diagram for a welding type selection circuit contained in an engine speed controller according to one embodiment of the present invention.
Figure 4:
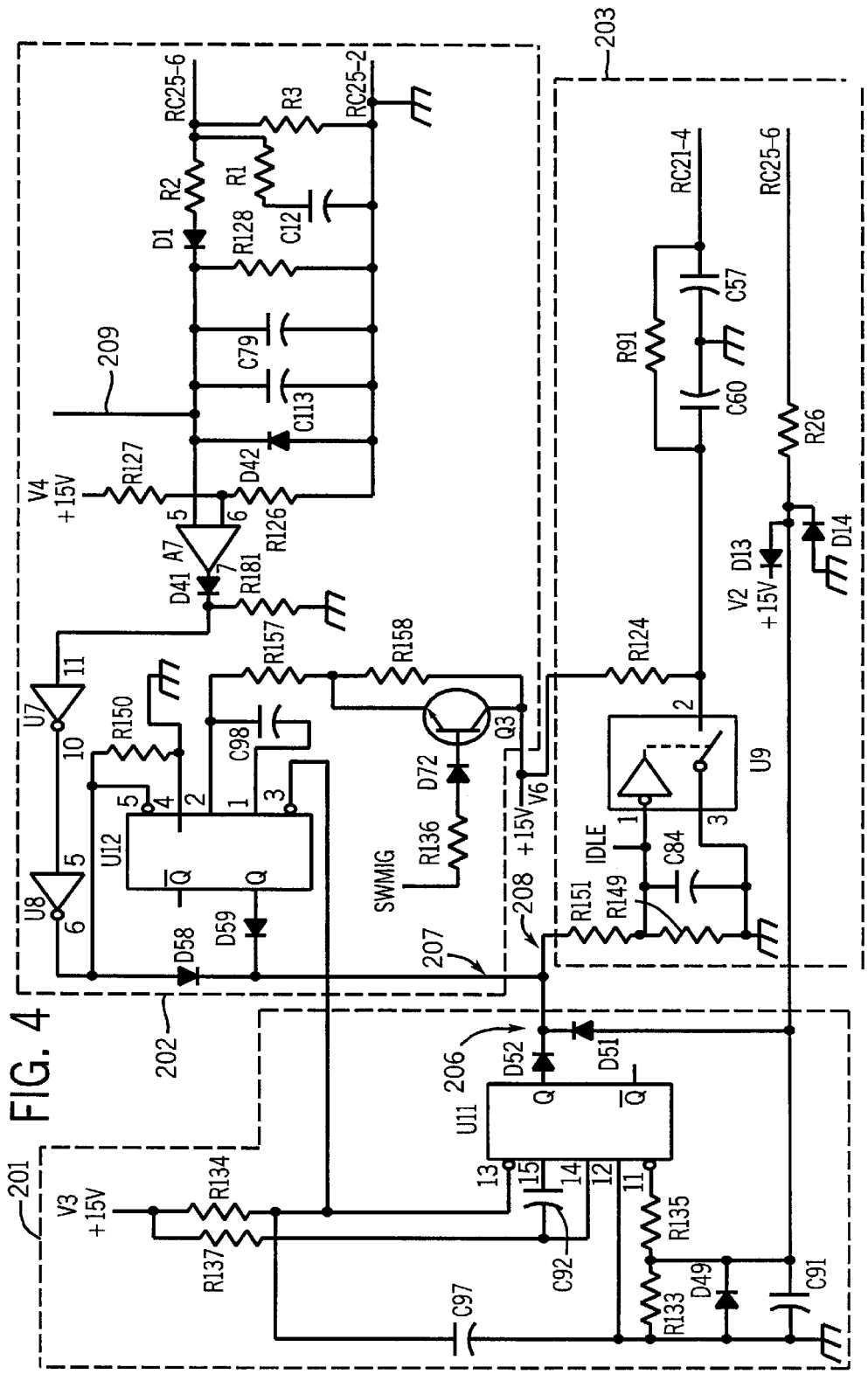
FIG. 4 shows an electrical schematic diagram for various electrical sub-circuits contained in an engine speed controller according to one embodiment of the present invention including an engine start sense circuit, a load current sense circuit and an idle command circuit.

A schematic diagram of control circuit 105 is shown in FIGS. 2–4. As shown, control circuit 105 includes several sub-circuits including an engine start sense circuit ("ESS" circuit) 201, a load current sense circuit ("LCS" circuit) 202, an idle command circuit 203, a contactor closure sense circuit ("CCS" circuit) 204 and a welding type selection circuit 205.

Each of these sub-circuits performs a specific function in the overall operation of control circuit 105 as it relates to the present invention. For example, ESS circuit 201 receives the engine crank signal from engine 101 as an input, processes the engine crank signal, and provides an output signal to idle command circuit 203 that is responsive to the engine crank signal. The output signal from ESS circuit 201 indicates that either an engine crank signal is present or that an engine crank signal was recently present.

Similarly, LCS circuit 202 receives the load current feedback signal from generator 102 indicating that a load current is present at one of the outputs to the welding generator (either at the welding output or the auxiliary output) or that a wire feeder is connected to the welding generator and is drawing a load current. The load current feedback signal is processed and an output signal is provided to idle command circuit 203 that is responsive to the load current feedback signal. The output signal from LCS circuit 202 indicates that either a load current in excess of a desired threshold is present or that a load current in excess of the threshold was recently present.

Idle command circuit 203 receives the outputs from ESS circuit 201 and LCS circuit 202, processes these signals, and provides the low power idle command signal to power circuit 106 in response to the input signal received. If the input from either ESS circuit 201 or LCS circuit 202 indicates the presence or recent presence of either a cranking signal or a load current, the idle command signal output from idle command circuit 203 assumes a high value. Otherwise, the idle command signal output from idle command circuit 203 is a low value. The idle command signal is used by power circuit 106 to control the speed of engine 101.

CCS circuit 204 is provided to allow the engine to switch from idle speed to run speed prior to any load current being present at the welding output of the generator. CCS circuit 204 receives a contactor closure signal as an input indicating that the trigger on a welding gun or remote control attached to the welding gun is closed. Whenever the generator is set to either MIG or TIG welding by the user, the contactor closure signal is provided as an output of CCS circuit.

The output of CCS circuit 204 is processed by LCS circuit 202 and is provided to idle command circuit 203. In response to receiving the input signal from CCS circuit 204, idle command circuit 203 provides an idle command signal that is used by power circuit 106 to switch the engine from idle speed to run speed before welding actually begins.

Welding type sense circuit 205 receives a user input from a dial or knob on welding generator 100 and provides an output signal that is indicative of the type of welding to be performed. The output of welding type sense circuit 205 is provided to those sub-circuits of control circuit 105 that make use of such information.

Figure 5:
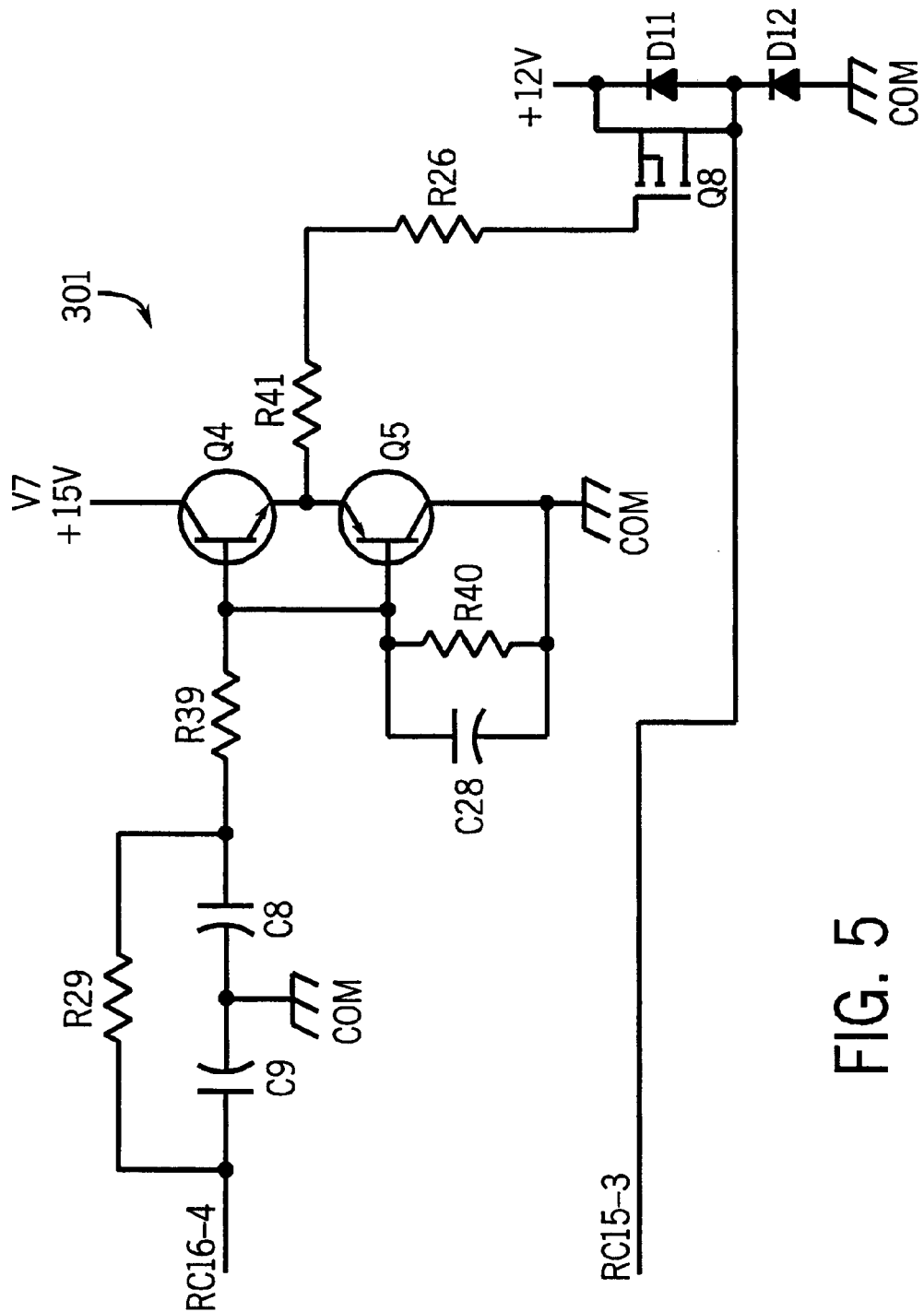
FIG. 5 shows an electrical schematic diagram for an engine speed control circuit according to one embodiment of the present invention.

Power circuit 104 includes an engine speed control circuit 301 as shown in FIG. 5. Engine speed control circuit 301 receives the low power idle command signal from idle command circuit 203 and converts it into a high power engine speed control signal. The engine speed control signal is provided to open and close the throttle of engine 101. The operation of engine speed controller 104, including control circuit 105 and power circuit 106, will now be described in detail.

We begin our detailed analysis of control circuit 105 with welding type selection circuit 205. Circuit 205 as shown in FIG. 2 includes a six position rotary switch S1. Switch S1 is connected to a user selectable input device 103, such as a dial, located on the front of welding generator 100. The operator simply turns the dial to select the desired type of welding to be performed such as MIG (also called GMAW), remote MIG, TIG (also called GTAW), remote TIG, stick (also called SMAW) and remote stick welding in one embodiment. Other types of welding can be selected in other embodiments including flux core arc welding (FCAW) and submerged arc welding (SAW). In addition, other embodiments allow for the selection of plasma cutting, air carbon arc cutting (CAC-A) and induction heating.

When a particular type of welding is selected by the user, a high signal (15 volts) is applied from power supply V1 to the output pin of switch S1 corresponding to the type of welding selected. The 15 volt signal from output pins 9 (remote MIG) and 11 (MIG) is fed through forward biased diodes D5 and D9 respectively directly to a first output labeled SWMIG and to a second output labeled MIG. The signal fed to the MIG output is first fed through a current limiting resistor R42 (10K ohms) and then through a Schmidt trigger inverter U5 which inverts the high 15 volt signal to a low signal (e.g., zero volts). A pull down resistor R43 (10K ohms) is connected between the cathode of both diodes D5 and D9 and ground to provide a ground reference for these diodes.

The 15 volt signal from output pins 3 (TIG) and 5 (remote TIG) is fed through forward biased diodes D7 and D6 respectively directly to a third output of circuit 205 labeled TIG. In addition, the 15 volt signal from pin 5 is also provided to a fourth output of circuit 205 through a second Schmidt trigger inverter U4 which inverts the high 15 volt signal to a low signal (e.g., zero volts). A pull down resistor R19 (10K ohms) is connected between the cathode of both diodes D6 and D7 and ground to provide a ground reference for these diodes.

In summary, circuit 205 receives a user selectable input indicating the desired type of welding to be performed and provides a variety of output signals in response thereto. These output signals include a high (SWMIG) and low (MIG) output signal indicating that MIG or remote MIG have been selected, a high (TIG) output indicating that TIG or remote TIG have been selected and a low output signal (TIGNOT) indicating that remote TIG has been selected. Each of these output signals are used by various other sub-circuits of control circuit 105 as described herein.

The electrical schematic for engine start sense circuit 201 is shown in FIG. 4. The input to ESS circuit 201 at pin RC25-6 is normally low (zero volts) when the engine is not in the process of being started. When ignition switch 107 on engine 101 is turned to the start position (e.g., cranking position), however, an engine crank signal is provided to the input of ESS circuit 201. This signal is a 9–12 volt dc signal provided by the battery of engine 101 through ignition switch 107 in this embodiment.

A current limiting resistor R26 (243 ohms) is provided in series with the input to circuit 201 and a pair of clamping diodes D13, D14 are connected across the input between a 15 volt dc supply V2 and ground. The clamping diodes are provided to insure that the signal passing to the rest of ESS circuit 201 is positive having a value of approximately zero to 15 volts. The clamped engine crank signal is then fed directly to the output 206 of circuit 201 through a forward biased blocking diode D51.

The clamped engine crank signal is also provided to the negative trigger input (pin 11) of a timer U11 through a current limiting resistor R135 (10K ohms). A filter capacitor C91 (0.001 microfarads), a clamping diode D49 and a pull-down resistor R133 (10K ohms) are connected between the engine cranking signal input to resistor R135 and ground. The positive trigger input (pin 12) of timer U11 is also connected to ground in this embodiment.

Timer U11 provides the warm-up time delay that is utilized to maintain the engine operating at run speed after the engine is started. Timer U11 is a monostable mulitvibrator that is connected in this circuit to trigger on the falling edge of a trigger signal.

The reset input of timer U11 (pin 13) is connected to a 15 volt dc power supply V3 through a resistor R134 (1M ohm). A capacitor C97 (1 microfarad) is connected between pin 13 and ground. Capacitor C97 delays the operation of timer U11 while the power supplies in control circuit 105 are powered up. Timer U11 will not operate until C97 is sufficiently charged at which point timer U11 is released to perform its timing functions.

The output (pin Q) of timer U11 is also connected directly to the output 206 of ESS circuit 201. Pin Q is connected to the output through a second blocking diode D52. The normal output state of pin Q is a low signal (e.g., ground) which keeps diode D52 back biased and turned off. The output of timer U11 at pin Q only changes from a low state to a high state when the input to pin 11 falls from a high value to a low value thereby producing a negative trailing edge. This occurs when the engine crank signal is no longer provided to circuit 201, such as when the ignition switch is released (moved from the start position to some other position). Thus, the falling edge of the engine crank signal received at RC25-6 triggers U11 to change states and the output at pin Q changes from a low state to a high state (approximately 15 volts in this embodiment). The high signal output from pin Q is then fed to the output 206 of ESS circuit 201 through forward biased blocking diode D52. Note that diode D51 is reversed biased when the output of timer U11 is high because no engine crank signal is present at this point in time.

The output of timer U11 at pin Q continues to remain high for a predetermined period of time (the warm-up time delay period) after the engine crank signal ceases to be present and then falls back to a low value. This time period is determined by the RC time constant of resistor R137 (1.5M ohms) and capacitor C92 (10 microfarads) which are connected across pins 14 (RXCX) and 15 (CX) of timer U11. This results in a time constant for the RC circuit that provides a warm-up time delay of approximately 3–5 seconds. The duration of the time delay can be changed to any desired value by simply changing the values of R137 and C92.

In an alternative embodiment of the present invention, the duration of the warm-up time delay is variable and can be adjusted (set) by the operator of welding generator 100.

Resistor R137, for example, is replaced with a variable resistor connected to a user selectable input device, such as a dial, located on the front of welding generator 100. By turning the dial, the operator can vary the resistance and thus the time constant for the RC circuit connected to timer U11. In an alternative embodiment, capacitor C92 is replaced with a variable capacitor, such as a capacitor bank, connected to a user selectable input device located on the front of welding generator 100.

In summary, the input signal (engine crank signal) and output signal of ESS circuit 201 are normally both low. Whenever ESS circuit 201 receives a high engine crank signal, it provides a high signal as an output. The output of ESS circuit 201 is high when the engine crank signal is present (e.g., is high) and remains high for a period of time after the engine crank signal ceases to be present. After the expiration of this time delay period, the output of ESS circuit 201 again falls to a low value.

The output of ESS circuit 201 is provided directly to the input 208 of idle command circuit 203. Before we describe the operation of circuit 203, however, we should fist discuss the operation of LCS circuit 202. This is because the output 207 of circuit 202 is also fed directly into the input 208 of idle command circuit 203.

In essence, the function of load current sensing circuit 202 is the same as that of ESS circuit 201 except that it uses a load current feedback (e.g., sensing) signal as its input in place of an engine crank signal. The input and output signals of circuit 202 are normally both low. Whenever circuit 202 receives a load current feedback signal above a set threshold, however, it provides a high output signal at 207. The output 207 of circuit 202 is high when the load current feedback signal is above the threshold (e.g., is high) and remains high for a predetermined period of time after the load current feedback signal falls below the threshold. Once the predetermined time delay has expired, the output 207 of circuit 202 falls to a low value. The operation of LCS circuit 202 will now be described in detail.

The load current feedback signal is received on pin RC25-5 (see FIG. 4) and is applied to burden resistor R3 (4.7K ohms) which converts the load current feedback signal into a voltage feedback signal usable by circuit 202. Resistor R1 (26.7 ohms) and capacitor C12 (0.33 microfarads) are connected in series across resistor R3 to filter unwanted noise and shape the voltage waveform across R3.

The load current feedback signal is provided to circuit 202 from a 180 turn toroidal sensing transformer (not shown) in this embodiment. Running through the center of the toroidal sensing transformer is one turn of the weld current lead, two turns of the auxiliary power output lead and four turns of the wire lead going to the wire feeder connection on welding generator 100. Thus, the sensing transformer is disposed to sense weld current, the current drawn at the auxiliary output and the current drawn by a wire feeder connected to welding generator 100.

Although load current sensing is used in this embodiment to determine if the welding generator is providing output power, the present invention is not limited to this method and other methods can be used. Any signal or parameter which indicates that there is a demand for output power or that output power is being provided can be utilized including output voltage and output power.

The particular value of burden resistor R3 is chosen to provide a desired threshold voltage level usable by circuit 202. In the embodiment shown in FIG. 4, R3 is chosen to produce a voltage threshold level of approximately two volts. This translates into a threshold load current level of half an amp at the auxiliary output or one amp of weld current at the weld output. Likewise, 250 milliamps of load current drawn by the drive motor of a wire feeder connected to welding generator 100 will also generate two volts across burden resistor R3 in this embodiment.

The voltage produced across resistor R3 is then fed into the non-inverting input of an op amp comparator A7 through a diode D1 and a voltage divider comprised of resistors R2 (10K ohms) and R128 (39.2K ohms). The voltage applied to the non-inverting input of comparator A7 can be adjusted slightly by adjusting the values of resistors R2 and R128. Diode D1 is provided to rectify the input voltage to the non-inverting input of comparator A7.

The non-inverting input of comparator A7 is limited (e.g., clamped) to a maximum of 5.1 volts by a zener diode D42 which is connected between the non-inverting input and ground. R2 also generally acts as a current limiting resistor to protect zener diode D42 from excessive current levels. Finally, filter capacitors C79 (0.33 microfarads) and C113 (0.1 microfarads) are connected between the non-inverting input of comparator A7 and ground.

The inverting input of comparator A7 is connected to a 15 volt dc power supply V4 through a voltage divider comprised of resistor R127 (15K ohms) and resistor R126 (1K ohm). This establishes a trip voltage for the comparator of approximately 1 volt in this embodiment. The value of R3 is chosen to insure that when the desired load current threshold is reached, the voltage across R3 will be greater than the trip voltage of the comparator plus the voltage drop across diode D1 plus the voltage drop across resistor R2. This insures that the 1 volt trip voltage of comparator A7 will be exceeded and the output of the comparator will be high (approximately 15 volts) when the load current exceeds the desired threshold. For any voltage across resistor R3 that is less than approximately 2 volts (e.g., when no load current is present, for example), the output of comparator A7 is low (approximately −15 volts).

When the output of comparator A7 is high, it is fed through a forward biased diode D41 to a first Schmidt trigger inverter U7 and then to a second Schmidt trigger inverter U8. The output of comparator A7 is twice inverted in order to provide a trigger signal having a fast negative trailing edge for use as a trigger signal as described below. D41 acts as a blocking diode when the output of comparator A7 is low. Resistor R181 (10K ohms) is connected to provide a ground reference for inverter U7.

The output of the second inverter U8 is provided both as an output 207 of circuit 202 and to the negative trigger input of a second timer U12. The twice inverted comparator output signal, which is high when a load current above the threshold is present, is fed directly to the output 207 of circuit 202 through a forward biased diode D58.

The other path for the twice inverted signal leads into the negative trigger input (pin 5) of timer U12. A pull down resistor R150 (10K ohms) to ground is also connected to pin 5 of timer U12. Timer U12 is a monostable mulitivibrator that is set up to trigger on the falling edge of a trigger pulse and so the positive trigger input at pin 4 is connected to ground. Timer U12 provides the time delay that delays engine 101 from returning to idle speed after welding generator 100 stops providing output power.

Like timer U11, the reset input of timer U12 (pin 3) is connected to 15 volt dc power supply V3 through resistor R134 (1M ohm). In addition, capacitor C97 (1 microfarad)

is connected between pin 3 and ground. Until C97 is sufficiently charged, timer U12 will not operate.

The output of timer U12 at pin Q is also connected directly to the output 207 of LCS circuit 202 through a diode D59. The normal output state of pin Q is a low signal (e.g., ground) which keeps diode D59 back biased and turned off. The output of timer U12 at pin Q only changes states when the twice inverted comparator output signal falls from a high value to a low value (negative trailing edge). This occurs when the load current falls below the threshold of circuit 202 such as when welding stops, when welding generator 100 stops providing auxiliary power or when a wire feeder connected to generator 100 stops drawing current.

In these cases, the falling edge of the twice inverted comparator output signal triggers U12 and Q changes from a low state to a high state (approximately 15 volts in this embodiment). The high signal output from pin Q is then applied directly to the output 207 of circuit 202 through forward biased diode D59.

The output of U12 stays high for a predetermined period of time after the load current ceases to exceed the threshold and then falls back to a low value. This time delay or timeout is determined by the time constant of the combination of one or more of the resistors R157 (221K ohms) and R158 (499K ohms) and capacitor C98 (68 microfarads) which are connected across pins 2 (RXCX) and 1 (CX) of U12. The duration of time delay can be changed by changing the time constant of the circuit.

In this embodiment, different length time delays are provided for switching the engine to idle speed after a load current falls below the threshold. The length of the time delay is determined by the type of welding selected or being performed. These are referred to herein as welding type dependent time delays. The different duration time delays are provided in the following manner by LCS circuit 202. The time constant for the RC circuit connected to timer U12 includes two series resistors R157 and R158 in this embodiment. When user selectable input 103 is set to TIG, remote TIG, stick or remote stick, both resistors R137 and R138 are included in the RC circuit connected to timer U11. This results in a time constant for the RC circuit that provides a time delay of 18–20 seconds before the engine switches from run to idle speed after a load current falls below the threshold (e.g., after welding stops or the generator stops providing output power).

When user selectable input device 103 is set to MIG or remote MIG, however, the high output signal from the SWMIG output of circuit 205 is provided to LCS circuit 202. The SWMIG output is provided to the base of transistor Q3 through a current limiting resistor R136 (10K ohms) and a forward biased blocking diode D72. With the SWMIG signal high, transistor Q3 turns on and shorts out resistor R158, effectively removing it from the RC circuit connected to timer U12. As a result, the time constant for the RC circuit decreases and a time delay of approximately 10 seconds is provided before the engine switches from run to idle speed when MIG or remote MIG welding is selected.

Although a single timer is used to produce the various welding type dependent time delays in this embodiment, it should be understood that in other embodiments, two or more timers are used to produce the various welding type dependent time delays. Likewise, although only two different (e.g., different in duration) welding type dependent time delays are shown herein, other embodiments provide more than two different welding type dependent time delays including three, four and five different time delays.

In an alternative embodiment of the present invention, the length of the time delay before returning the engine to idle speed after a load current falls below the threshold is variable and adjustable by the user. Resistors R157 and R158, for example, can be replaced with a variable resistor connected to a user selectable input device, such as a dial, located on the front of welding generator 100. By turning the dial, the operator can vary the resistance and thus the time constant for the RC circuit connected to timer U12. In an alternative embodiment, capacitor C98 is replaced with a variable capacitor, such as a capacitor bank, connected to a user selectable input device located on the front of welding generator 100.

In addition to the load current sense signal, the output 208 of CCS circuit 204 is also fed into the non-inverting input of comparator A7 (see FIG. 4) at input 209. CCS circuit 204 receives a high contactor closure signal as an input at START 2. This signal is provided in this embodiment when the trigger on a welding gun is pulled or when the contacts on a welding gun remote control device are closed. The contactor closure signal is provided to pin 6 of normally open analog switch U10. Switch U10 is open when a high signal is present at input pin 8 of switch U10. This signal is provided from a 15 volt supply V5 through a pull-up resistor R123.

Switch U10 is closed, however, whenever user selectable device 103 is set to MIG, remote MIG or remote TIG welding. This allows the contactor closure signal to pass to the non-inverting input of comparator A7. This occurs because when MIG or remote MIG are selected, the low MIG output of circuit 205 is provided as an input to circuit 204. Diode D38 turns on and conducts through current limiting resistor R115 (1K ohm). The voltage at pin 8 of switch U10 is then divided between R123 and R115 and a low signal is provided to pin 8. This closes switch U10 and the contactor closure signal is provided directly to the input of comparator A7 through a forward biased blocking diode D40.

In a similar manner, when remote TIG is selected, the low TIGNOT signal from circuit 205 is provided to circuit 204. Diode D39 conducts through current limiting resistor R116 (1K ohm). The voltage at pin 8 of switch U10 is then divided between R123 and R116 and a low signal is provided to pin 8. This also closes switch U10 and the contactor closure signal is provided directly to the input of the comparator A7, again through forward biased blocking diode D40.

The contactor closure signal at the non-inverting input of comparator A7 is compared to the 1 volt trip voltage of the comparator. If the contactor closure signal is greater that one volt (indicating that the trigger on the welding gun or the contacts on the remote control device are closed), the output of comparator A7 will be high (the same outcome as when a load current is sensed above the threshold). If the contactor closure signal is below 1 volt (indicating that the trigger on the welding gun or the contacts on the remote control device are not closed), the output of comparator A7 will be low (the same outcome as when no load current is sensed). The remainder of LCS circuit 202 operates in the same manner as previously described.

To summarize, the output signal 207 provided from LCS circuit 202 is normally low when no output power is being drawn from welding generator 100 (e.g., the load current is below the desired threshold). However, as soon as a load current above the threshold is sensed (indicating that output power is being supplied), the output of LCS circuit 202 switches to a high value and remains high for a period of time after the load current drops below the threshold at which time the output 207 of LCS circuit 202 again falls to a low value.

The output 207 of LCS circuit 202 also switches to a high value when a contactor closure signal is provided to LCS circuit 202. The output remains high for a period of time after the contactor closure signal ceases to be present at which time the output of LCS circuit 202 again falls to a low value. The contactor closure signal is only provided to LCS circuit when MIG, remote MIG or remote TIG welding are selected on user selectable input device 103 in this embodiment.

The output signal 206 from ESS circuit 201 and the output signal 207 from LCS circuit 202 are fed directly into the input 208 of circuit 203. These signals are received by circuit 203 and are fed into the input (pin 1) of an analog switch U9 through a current limiting resistor R151 (10K ohms). The other input pin (pin 3) of analog switch U9 is connected directly to ground. A pull down resistor R149 (100K ohms) and a filter capacitor C84 (0.1 microfarads) are also connected to pin 1 of analog switch U9 with the other end of each of these components connected to ground. Resistor R149 is provided to pull the cathode of blocking diodes D51, D52, D58 and D59 to ground. Capacitor C84 filters out any unwanted ac noise that may be present at the input to switch U9.

The output (pin 2) of switch U9 is provided directly to output pin RC21-4 of circuit 203 as the idle command signal. Switch U9 is normally closed when the input at pin 1 is a low signal. In the normally closed position, grounded pin 3 is connected directly to the output of switch U9. Thus the idle command signal output from circuit 203 is low when the output of ESS circuit 201 is low (no engine cranking signal) and when the output of LCS circuit 202 is low (no load current above the threshold and no contactor closure signal).

When a high signal is applied to pin 1 of analog switch U9, however, switch U9 opens. With switch U9 open, a low power 15 volt dc signal is applied to pin RC21-4 as the idle command signal. The 15 volt dc signal is provided by power supply V6. Thus, when a high output signal is received at the input 208 to idle command circuit 203 from either ESS circuit 201 or LCS circuit 202, the idle command signal provided at pin RC21-4 is also high. A pi filter comprising resistor R91 (243 ohms) and capacitors C57, C60 (0.1 microfarads) is provided in series with output pin RC21-4 to filter any unwanted noise that may be coming back into circuit 203 through pin RC21-4.

In summary, the output (idle command signal) of circuit 203 is normally low when the input 208 to circuit 203 from ESS circuit 201 and LCS circuit 202 are both low.

Whenever ESS circuit 201 receives a high engine crank signal, it provides a high output signal. The idle command signal output from circuit 203 is therefore high when the engine crank signal is present (e.g., is high) and remains high for a period of time (e.g., warm-up time delay) after the engine crank signal ceases to be present. After the expiration of the time delay period, the idle command signal again falls to a low value.

Likewise, whenever LCS circuit 202 receives a load feedback sense signal above its threshold or a contactor closure signal, it provides a high output signal to circuit 203. The idle command signal output from circuit 203 is therefore high when a load current above the threshold is present or when a contactor closure signal is present and remains high for a period of time (e.g., time delay applied when welding generator 100 stops supplying output power) after the load current drops below the threshold or the contactor closure signal disappears. After the expiration of the time delay period, the idle command signal again falls to a low value.

The idle command signal provided by idle command circuit 203 is provided to the input of an engine idle control circuit 301 located on power circuit 106. The purpose of engine idle control circuit 301 is to convert the low power idle command signal from control circuit 105 into a higher power engine speed control signal that can be used by the engine to control engine speed.

The idle command signal from circuit 203 is provided to engine speed control circuit 301 at input pin RC16-4 as shown in FIG. 5. A pi filter comprising resistor R29 (243 ohms) and capacitors C8, C9 (0.1 microfarads each) is provided at the input to circuit 301 to filter out any unwanted noise or transients that may be present at pin RC16-4. The idle command signal is provided to the base of each of a pair of bipolar transistors through a current limiting resistor R39 (1K ohm). Transistors Q4 and Q5 are stacked in a totem pole configuration between a 15 volt dc supply V7 and ground. A pull-down resistor R40 (100K ohms) and a filter capacitor C28 (0.1 microfarads) are also connected between the base of each transistor Q4, Q5 and ground.

The totem pole comprising transistors Q4 and Q5 operates in the following manner. Whenever the idle command signal is high, transistor Q4 is turned on and transistor Q5 is turned off. With transistor Q4 on, 15 volts from power supply V7 is provided to the gate of power MOSFET transistor Q8 through current limiting resistors R41 (100 ohms) and resistor R26. (1K ohm). This turns transistor Q8 off which prevents the 12 volt signal from power supply V8 from being fed to the output (pin RC15-3) of engine speed control circuit 301. A pair of clamping diodes D11 and D12 are connected between power supply V8 and ground to protect transistor Q8.

In the alternative, when the idle command signal into circuit 301 is low, transistor Q4 is off and transistor Q5 is on. This results in the gate of transistor Q8 being connected to ground which turns transistor Q8 on. With transistor Q8 turned on, the 12 volt signal from power supply V7 is fed to output pin RC15-3 of circuit 301 as the engine speed control signal.

The engine speed control signal from engine control circuit 301 is provided directly to the idle throttle solenoid on engine 101. This signal is used by engine 101 to open and close the throttle. When the engine speed control signal is low, the throttle opens and the engine switches from idle speed to run speed. When the engine speed control signal is high, on the other hand, the throttle closes and the engine switches from run speed to idle speed.

Figure 6:
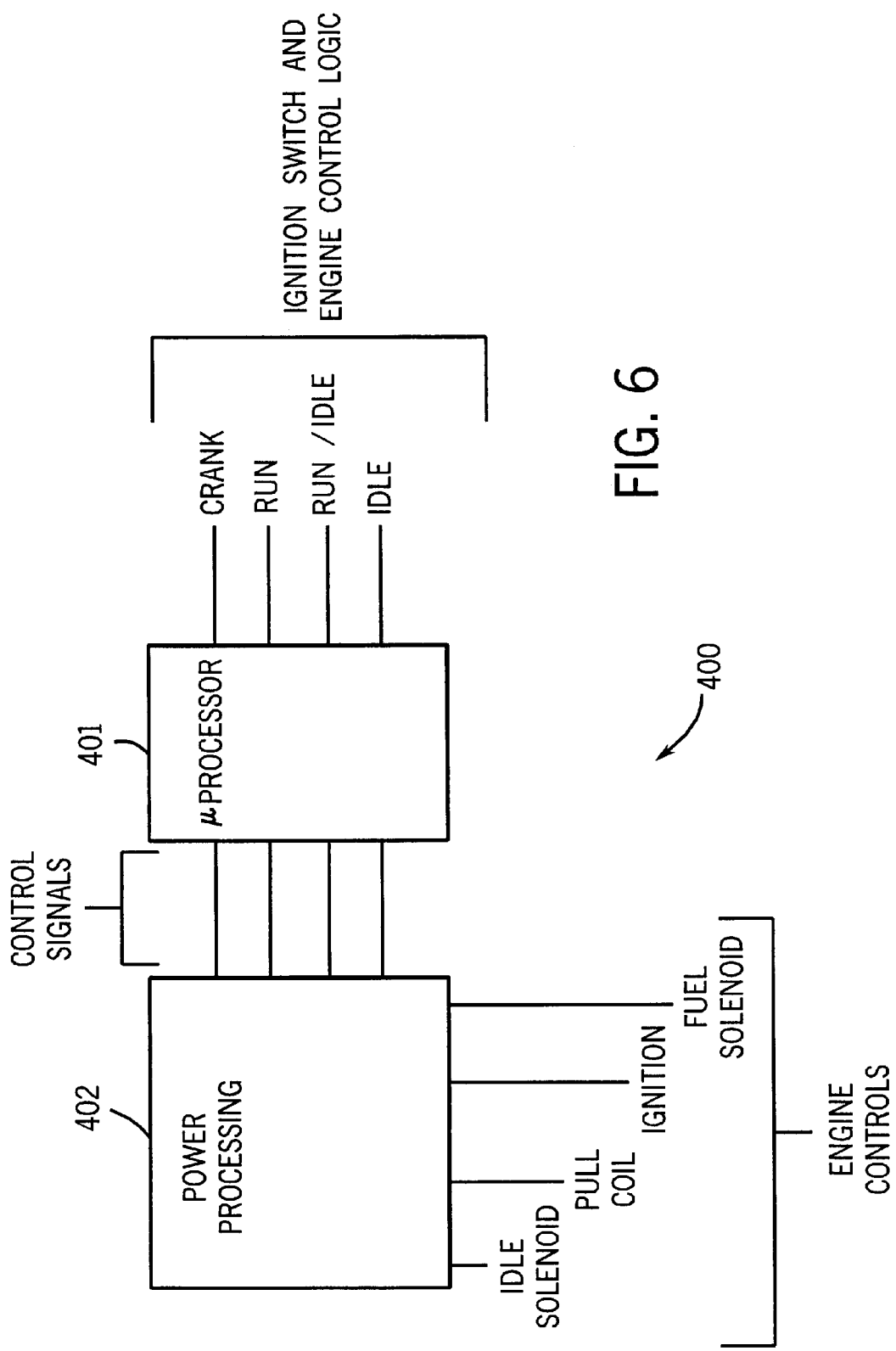
FIG. 6 shows a block diagram of an engine speed controller according to an alternative embodiment of the present invention.

An alternative embodiment of an engine speed controller of the present invention is shown in FIG. 6. Engine speed controller 400 includes a microprocessor 401 and a power circuit 402. Microprocessor 401 performs all of the functions of ESS circuit 201, LCS circuit 202, idle command circuit 203, CCS circuit 204 and welding type selection circuit 205 in this embodiment.

In this embodiment, microprocessor 401 receives the engine cranking signal from ignition switch 107 and the load current feedback signal from generator 102. These signals are processed by microprocessor 401 and an a low power idle command signal is provided to power circuit 402 in response to the engine cranking signal and the load current feedback signal. Power circuit 402 converts the low power idle command signal into an engine speed control signal usable by engine 101 to control engine speed. The various time delays are provided by microprocessor 401 in this embodiment.

Numerous modifications may be made to the present invention which still fall within the intended scope hereof. Thus, it should be apparent that there has been provided in accordance with the present invention an engine driven welding generator and a method and apparatus for controlling engine speed that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welding apparatus comprising:
   an engine;
   a generator operatively coupled to the engine, wherein the generator provides at least one of a welding output or an auxiliary power output; and
   an engine speed controller configured to control operation of the engine such that the engine operates at a run speed upon starting and then changes speed to an idle speed following a first time delay that is substantially equal to the minimum period of time required for the engine to warm up sufficiently after starting to maintain engine operation at the idle speed.

2. The welding apparatus of claim 1 wherein the first time delay is a variable time delay the duration of which can be adjusted by an operator of the welding apparatus.

3. The welding apparatus of claim 1 wherein the engine operates at the run speed when output power is provided and further wherein the engine speed controller provides a second time delay to delay switching of the engine speed to the idle speed when the welding apparatus stops providing output power, thereby permitting continuous operation of the engine at the run speed during brief interruptions in the demand for output power.

4. The welding apparatus of claim 3 wherein the second time delay is different in duration than the first time delay.

5. The welding apparatus of claim 3 wherein the second time delay is a variable time delay the duration of which can be adjusted by an operator of the welding apparatus.

6. A method of operating an engine driven welding generator comprising:
   providing a first engine speed control signal to the engine;
   responsive to the first engine speed control signal, operating the engine at a run speed upon starting; and
   responsive to the first engine speed control signal, changing the engine speed to an idle speed after a time delay that is substantially equal to the minimum period of time required for the engine to warm up sufficiently after starting to maintain engine operation at the idle speed.

7. The method of claim 6 further comprising:
   providing a second engine speed control signal to the engine;
   responsive to the second engine speed control signal, operating the engine at the run speed when output power is provided; and
   responsive to the second engine speed control signal, delaying switching of the engine speed to the idle speed when the welding apparatus stops providing output power.

8. A welding apparatus comprising:
   an engine capable of operation at a run speed and an idle speed;
   a generator operatively coupled to the engine, wherein the generator provides at least one of a welding output or an auxiliary power output; and
   an engine speed controller, wherein the engine speed controller includes an input for receiving an engine starting signal indicative of the engine starting, and further wherein the engine speed controller provides an engine speed control signal to the engine to cause the engine to operate at a run speed in response to the engine staring signal.

9. The welding apparatus of claim 8 wherein the engine starting signal is an engine cranking signal provided from an ignition switch.

10. The welding apparatus of claim 8 wherein the engine receives the engine speed control signal and in response operates at the run speed when first started and then automatically changes speed to the idle speed after a time delay.

11. The welding apparatus of claim 10 wherein the time delay is substantially equal to the minimum time period required for the engine to warm up sufficiently to maintain engine operation at the idle speed.

12. The welding apparatus of claim 10 wherein the time delay is approximately 3–5 seconds in duration.

13. The welding apparatus of claim 10 wherein the time delay is a variable time delay that can be adjusted by an operator of the welding apparatus.

14. A method of operating an engine driven welding generator comprising:
   providing an engine starting signal indicative of an engine starting;
   controlling the speed of the engine to operate at a run speed in response to the engine starting signal.

15. The method of claim 14 wherein controlling the speed of the engine includes operating the engine at a run speed when first started and then changing the speed of the engine to an idle speed after a time delay.

16. The method of claim 15 wherein the time delay is substantially equal to the minimum time period required for the engine to warm up sufficiently to maintain engine operation at the idle speed.

17. The method claim 15 wherein the time delay is approximately 3–5 seconds in duration.

18. An engine driven welding generator comprising:
   an engine; and
   an engine control, wherein the engine control causes the engine to operate at a run speed when first started and then automatically changes speed to an idle speed after a time delay that is substantially equal in length to a minimum period of time required for the engine to warm up sufficiently after starting to maintain engine operation at the idle speed.

19. A welding apparatus comprising:
   an engine capable of operation at a run speed and an idle speed;
   a generator operatively coupled to the engine, wherein the generator provides at least one of a welding output or an auxiliary power output; and
   a first engine speed control circuit wherein the first engine speed control circuit provides a first engine speed control signal to the engine such that the engine operates at the run speed when first started and then automatically changes speed to the idle speed after a first time delay; and a second engine speed control circuit wherein the second engine speed control circuit provides a second engine speed control signal to the engine such that the engine operates at the run speed after the generator stops providing output power and then automatically changes to the idle speed after a second time delay.

20. The welding apparatus of claim 19 wherein the second time delay is different in duration than the first time delay.

21. The welding apparatus of claim 19 wherein the first time delay is approximately 3–5 seconds in duration and the second time delay is approximately 10–20 seconds in duration.

22. The welding apparatus of claim 19 wherein the first time delay is substantially equal to the minimum time period required for the engine to warm up sufficiently to maintain engine operation at the idle speed and the second time delay is approximately 10–20 seconds in duration.

23. The welding apparatus of claim 19 wherein the second time delay is a variable time delay the duration of which can be adjusted by an operator of the welding apparatus.

24. A welding apparatus comprising:
   an engine;
   a generator operatively coupled to the engine, wherein the generator provides at least one of a welding output or an auxiliary power output; and
   an engine speed controller wherein the engine speed controller is configured to control the engine such that the engine operates at a run speed upon starting and then changes speed to an idle speed after a first time delay and further operates at the run speed after the generator stops providing output power and then changes to the idle speed after a second time delay different in duration from the first time delay.

25. The welding apparatus of claim 24 wherein the first time delay is substantially equal to the minimum time period required for the engine to warm up sufficiently to maintain engine operation at the idle speed.

26. The welding apparatus of claim 24 wherein the first time delay is approximately 3–5 seconds in duration.

27. The welding apparatus of claim 26 wherein the second time delay is approximately 10–20 seconds in duration.

28. The welding apparatus of claim 24 wherein the first time delay is a variable time delay that can be adjusted by an operator of the welding apparatus.

29. The welding apparatus of claim 24 wherein the second time delay is a variable time delay that can be adjusted by an operator of the welding apparatus.

30. A method of operating an engine driven welding generator comprising:
   starting the engine;
   then, operating the engine at a run speed when first started;
   then, switching the engine speed to an idle speed after a first time delay;
   then, providing output power;
   then, operating the engine at the run speed after the welding apparatus stops providing output power; and
   then, switching the engine to the idle speed after a second time delay different in duration from the first time delay.

31. A method of operating an engine driven welding generator comprising:
   providing a first time delay signal to control engine speed when the engine is first started;
   responsive to the first time delay signal, permitting the engine to warm up sufficiently at run speed before switching the engine speed to an idle speed;
   providing a second time delay signal to the engine different in duration from the first time delay signal;
   responsive to the second time delay signal, permitting continuous operation of the engine at run speed during brief interruptions in the demand for output power.

32. The method of claim 31 wherein the first time delay is approximately 3–5 seconds in duration and the second time delay is approximately 10–20 seconds in duration.

33. The welding apparatus of claim 32 wherein the first time delay is substantially equal to the minimum time period required for the engine to warm up sufficiently to maintain engine operation at the idle speed and the second time delay is approximately 10–20 seconds in duration.

34. An engine driven welding generator comprising:
   an engine; and
   an engine control having a first time delay for changing the speed of the engine to an idle speed alter the engine is started and a second time delay, different in duration from the first time delay, for switching the engine to the idle speed after the welding generator stops providing output power.

35. A welding apparatus comprising:
   an engine;
   a generator operatively coupled to the engine, wherein the generator provides at least one of a welding output or an auxiliary power output; and
   an engine speed controller wherein the engine speed controller provides a first time delay for changing the speed of the engine to an idle speed after the welding apparatus stops providing a first type of welding power and a second time delay, different in duration from the first time delay, for switching the engine to the idle speed after the welding apparatus stops providing a second type of welding power different from the first type of welding power.

36. The welding apparatus of claim 35 wherein the first time delay is approximately 10–12 seconds in duration and the second time delay is approximately 18–20 seconds in duration.

37. The welding apparatus of claim 36 wherein the first type of welding power is a selective one of MIG or TIG welding power and the second type of welding power is stick welding power.

38. The welding apparatus of claim 35 wherein the first time delay is a variable time delay that can be adjusted by an operator of the welding apparatus.

39. A welding apparatus comprising:
   an engine;
   a generator operatively coupled to the engine, wherein the generator provides at least one of a welding output or an auxiliary power output; and
   an engine speed controller wherein the engine speed controller provides a time delay for changing the speed of the engine to an idle speed after the generator stops providing welding output power, and further wherein the engine speed controller includes an input for receiving a welding type sense signal indicative of the type of welding output power provided, wherein the duration of the time delay is a function of the welding type sense signal.

40. An engine driven welding generator comprising:
   an engine; and
   an engine control wherein at he time delay in switching the engine speed of the engine to an idle speed after the welding generator stops providing welding output power is a function of the type of welding output power provided by the welding generator.

* * * * *